United States Patent
Monson

[11] Patent Number: 5,870,686
[45] Date of Patent: Feb. 9, 1999

[54] INTELLIGENT MOBILE PRODUCT APPLICATION CONTROL SYSTEM

[75] Inventor: Robert J. Monson, St. Paul, Minn.

[73] Assignee: Ag-Chem Equipment Co., Inc., Minnetonka, Minn.

[21] Appl. No.: 915,847

[22] Filed: Aug. 21, 1997

Related U.S. Application Data

[63] Continuation of Ser. No. 571,467, Dec. 13, 1995, abandoned.

[51] Int. Cl.[6] ............................ G08G 1/123; A01C 15/00
[52] U.S. Cl. ............................... 701/1; 701/50; 701/202; 701/207; 364/469.02; 340/990; 340/995; 239/1; 239/656
[58] Field of Search .................................. 701/200, 202, 701/207, 208, 212, 50, 1, 44; 364/469.02; 340/990, 995; 239/1, 655, 656, 664

[56] References Cited

U.S. PATENT DOCUMENTS

| | | | |
|---|---|---|---|
| 3,648,930 | 3/1972 | Brown et al. | 239/156 |
| 3,871,587 | 3/1975 | Gail | 239/662 |
| 4,630,773 | 12/1986 | Ortlip | 239/1 |
| 5,052,627 | 10/1991 | Balmer | 239/655 |
| 5,220,876 | 6/1993 | Monson et al. | 111/130 |
| 5,242,120 | 9/1993 | Barber et al. | 239/656 |
| 5,442,349 | 8/1995 | Inoue et al. | 340/995 |
| 5,532,690 | 7/1996 | Hertel | 340/989 |

*Primary Examiner*—Jacques H. Louis-Jacques
*Assistant Examiner*—Tyrone V. Walker

[57] ABSTRACT

An intelligent mobile product application control system capable of controlling product application by calculating control values on a per position basis from data that has traditionally been used to generate digital land area maps. The system includes a vehicle having coupled thereto at least one distributed network including at least one intelligent control module having a geographic raw data processor. The intelligent control module is responsive to raw geographic information data for controlling at least one actuator device in a manner that results in at least one predetermined product being applied to a predetermined geographic land area at variable rates determined by the raw geographic information data.

29 Claims, 9 Drawing Sheets

INTELLIGENT MOBILE PRODUCT APPLICATION CONTROL SYSTEM

This application is a continuation of prior application Ser. No. 08/71,467filed on Dec. 13, 1995, now abandoned.

FIELD OF THE INVENTION

This invention relates to product application control systems. More particularly, this invention relates to a modular expandable product application control system having incorporated therein a raw data geographical information system for use on vehicles, either self-propelled or towed.

BACKGROUND OF THE INVENTION

Present mobile product application control systems are generally designed for simple closed loop control of a multiple loop network or are otherwise directed generally toward a single open loop distributed network. At present, the maximum amount of loops that can be added to a multiple closed loop network typically would approach ten. Beyond this value, the overall packet structure and network control would become cumbersome, requiring significant redesign of the overall closed loop system.

A typical closed loop system is laid out with a host controller located within the cab of a vehicle, made up of a processor with associated input and output devices. This host controller is typically directly linked to a second controller located within the cab, which is responsible for all communication to devices on the chassis of the vehicle. Such a system is shown in U.S. Pat. No. 4,630,773 to Ortlip, issued Dec. 23, 1986 entitled "Method and Apparatus for Spreading Fertilizer." Another system is shown in U.S. Pat. No. 5,220,876 to Monson et al., issued Jun. 23, 1993 entitled "Variable Rate Application System" and assigned to the Assignee of the present invention. Both the '773 and '876 patents are incorporated herein by reference in their entirety.

In closed loop systems such as those stated above, the addition of loops as a result of further control requirements adds great complexity to the system wiring. This results in a realistic limit to the amount of loops that can be added to a single system. Beyond this limit, the amount of wiring becomes too great and routing the wiring is a considerable challenge. At present, it is felt that ten loops is the approximate limit for a single host system for the type described above.

Software construction also places many constraints on the design and application of a control system. The common top down design has certain flow characteristics that define a specific flow path within the operating system. This also limits the effective amount of devices that can be controlled with a single system, as eventually the communication link to the devices becomes the limiting factor.

The aforementioned software construction implies that any changes in the requirements, such as the inclusion of an additional loop on the vehicle, often causes sweeping changes within the code. This also has obvious trickle-down effects that are not desired within the flow structure of the program.

Thus, debugging and testing become required parts of the system maintenance, requiring large amounts of capital and time to assure a simple change has not caused greater errors elsewhere in the system (often occurring in totally unrelated places).

One solution to the many problems stated herein before was addressed in U.S. Pat. No. 5,630,924, to Monson et al., issued Sep. 26, 1995, entitled "Mobile Control System Responsive to Land Area Maps", and assigned to the Assignee of the present invention. The '924 patent is incorporated by reference in its entirety herein. The inventive system disclosed and claimed by Monson et al. in the '924 patent effectively eliminated the requirement for multiple closed loops by utilizing a single open loop distributed network. This was accomplished with the use of modern hardware and software capabilities. In particular, the system utilized object oriented software design as well as Microsoft® Windows® interfacing, distributed network controls and Echelon™ LonWorks™ network technology.

For the aforementioned reasons, it becomes immediately apparent that existing closed loop product application control system designs are by no means desirable, and entirely new approaches are required. While the solution provided by Monson et al. in the '924 patent addressed many of the problems associated with closed loop product application control systems, a need still exists for a system architecture which, to a great extent, is independent of the media and network protocol utilized. The present invention described in detail hereinafter offers an additional solution to the stated problems.

SUMMARY OF THE INVENTION

The present inventive product application control system provides a novel method and apparatus which overcomes many of the shortcomings and attendant disadvantages of past control systems utilized by the agronomics industry. Several problems are considered unavoidable within the industry, some of which have been discussed previously. The present invention, however, overcomes many of these problems with a new approach to controls design.

Object-oriented design was developed within the software industry to create a system capable of expansion or retraction with very little effect on the system as a whole. The present invention utilizes this principle in a manner previously unknown or contemplated by those skilled in the art. Instead of expanding on the use of a single distributed network system, as known in the art, the present invention expands the control system into a multiple distributed network system, with any expansion having only a transparent effect on the system as a whole. As stated previously, this has been accomplished through the use of several state-of-the-art technologies including the aforementioned object-oriented software design, as well as windows interfacing, distributed network controls and modern network technology, e.g., Echelon™ LonWorks™ or CANs network technology.

Object-oriented software design is critical in an ever-changing system such as that displayed by the present invention. With the use of objects, the software is translated from a top-down flowchart into a dynamic system that reacts to the world around it, in much the same manner one would expect the control system to operate. This is accomplished with a message-based system such as the Windows® interface which increases usability, but also allows a new approach to task completion.

The objects are designed in a fashion that allows ease of expansion and upgradability, easing maintenance in the future. Because of the packaging of objects, the trickle-down effect is removed from the system when upgrades are incorporated. Thus, the flow of the system is not so completely interrelated, and a change in one area will not cause unexpected problems elsewhere, as was the case in past closed loop systems.

The aforementioned inventive control system also greatly simplifies system testing since only the area of interest need be tested. Because the actual flow path of other areas is not disturbed in any way, it is not necessary to perform redundant and excessively costly testing of the complete system. Thus, system testing becomes an option and not a necessity.

Distributed network controls were selected for the present inventive system for much the same reason as object-oriented software. Use of a distributed network is intended to create the simplest method of network expansion or retraction without excessively burdening the system with overhead costs. In other words, with a standard closed loop system, it is easy to include ten control loops on every machine in order to create a common fleet of vehicles. Unfortunately, this means unnecessary costs are incurred on vehicles requiring only one loop. Thus, a distributed network control system has been developed which only allows required hardware as necessary components.

The control system design allows ease of expansion as discussed previously, but also brings a great enhancement in the area of manufacture. The present invention further incorporates a single cable which is run into the cab for each distinct network which is embodied on the vehicle. Each cable preferably contains a twisted pair of wires through which the network communicates with the host and a second pair to twisted wires providing power to the network. All other network wiring is external to the cab, itself, a great improvement over existing systems. Thus, the majority of the wiring has been removed beyond the cab to the location of the actuation and sensing. This means that complex, machine dependent wiring occurs only at the actuator or point of sensing and in a modular fashion.

Proper development of a multiple distributed network, also allows the node hardware to be identical from node to node, which implies that each machine control system is identical, with the only differences being in the number of nodes and the machine dependent wiring such as that displayed by the present invention.

Placing the node control at the location of the actuator reduces 1) attenuation of the signal, 2) the incorporation of noise 3) the packaging of loop-dependent controllers, and 4) continuation of the signal. Thus, the intelligence of the controllers is distributed throughout the vehicle. This also allows a great enhancement of the associated diagnostic system. With the control loop separated, and each node capable of self-sustained control, each loop can also be responsible for diagnostics, data-logging, communication and even the real generation of expert systems, if so desired, thereby allowing the main processor to simultaneously orchestrate command processing and control of more than a single distributed network.

The present inventive system additionally incorporates intelligent network technology such as Echelon™ LonWorks™ technology or CANs technology to support the aforementioned benefits. The system is capable of incorporating multiple intelligent networks. For example, the control system may include a product application control network, a vehicle location sensing network, a chassis control network and/or a product development sensing network for providing data relating to plant development. Each of the networks is capable of operation independently of the others. Further, each distributed network may communicate with the host using its own communication technology independent of that used by the other networks. This allows the use of Echelon™ LonWorks™ or CANs network technology, for example, which may be developed in the future.

In one embodiment the invention is a control system capable of controlling product application by calculating control values on a per position basis from data that has traditionally been used to generate digital land area maps. Such maps have heretofore been created first and then loaded into the control system and then used to provide the data used to calculate control values in a manner such as described in the '924 patent, the '876 patent and the '773 patent. The elimination of the need to store these digital land area maps in the control system is a significant improvement, especially for high resolution maps such as required for control of liquid fertilizer application which may be too large to store or at least difficult and time consuming to load. As used herein the term "product application" has a broad meaning and includes the application of seeds, fertilizers (dry or liquid) herbicides, pesticides and other chemicals. It also includes other agronomic inputs which act on a particular geographic land area but which do not result in a product, per se, being deposited on the land. An example of such an agronomic input is controlling the depth of soil tillage.

In this embodiment the invention is a mobile product application control system. The control system includes a vehicle which may be self-propelled or adapted to be towed. At least one distributed network is coupled to the vehicle. The distributed network includes at least one intelligent control module. The intelligent control module constitutes means to control at least one actuator device in a manner such that at least one predetermined product is applied to a predetermined geographic land area at variable rates determined by raw geographic information data which is processed by the control system.

The control system includes a geographic information raw data processor for processing raw geographic information data which is input to the at least one distributed network through at least one geographic information raw data input device. The geographic information raw data processor may constitute a portion of the at least one intelligent control module. Alternatively, the geographic information raw data processor may comprise a portion of a host computer which is coupled to the at least one distributed network and constitutes a further element of the inventive control system. A still further alternative is that the geographic information raw data processor may be shared between the at least one intelligent control module and the host computer such that a portion lies within each.

The control system may further comprise a network server coupled between the at least one computer and the at least one distributed network for controlling the exchange of information between the computer and distributed network. The system may further include an expert system which is coupled to the at least one distributed network. The expert system defines specific relationships between different items of raw geographic information data, those relationships being utilized by the geographic information raw data processor to determine the correct rate of application of the product. The control system may also be responsive to attribute data which is additional data which is non-geocoordinate specific.

In a still further embodiment the invention comprises a method of controlling application of a product to a predetermined geographic land area. The method comprises providing a vehicle having at least one input actuator device. The vehicle is caused to travel over the surface of the geographic land area. As the vehicle travels raw geographic information data relating to the specific geocoordinates of the location of the vehicle on the predetermined geographic land area is processed. The processed raw geographic information data is used in controlling at least one actuator device in a manner that results in application of at least one predetermined product to the predetermined geographic land area at variable rates determined by the processed geographic information data. Thus, the method results in the application of the product at a specific rate which is calculated according to the geocoordinate position of the vehicle on the predetermined geographic land area based upon the processing of raw geographic information data relating to that specific geocoordinate location without the necessity of storing one or more entire digital land area maps in the system.

From the foregoing, it is clear the present inventive control system performance is greatly enhanced over existing systems. Other features of the present inventive product application control system include ease of use, manufacture, enhanced serviceability, maintainability, upgradability, and enhanced expansion and diagnostics capability.

BRIEF DESCRIPTION OF THE DRAWINGS

Other objects and features of the present invention and many of the attendant advantages of the present invention will be readily appreciated as the same become better understood by reference to the detailed description when considered in connection with the accompanying drawings in which like reference numerals designate like parts throughout the figures thereof and wherein.

DETAILED DESCRIPTION OF THE PREFERRED EMBODIMENTS

Background

Figure 1:
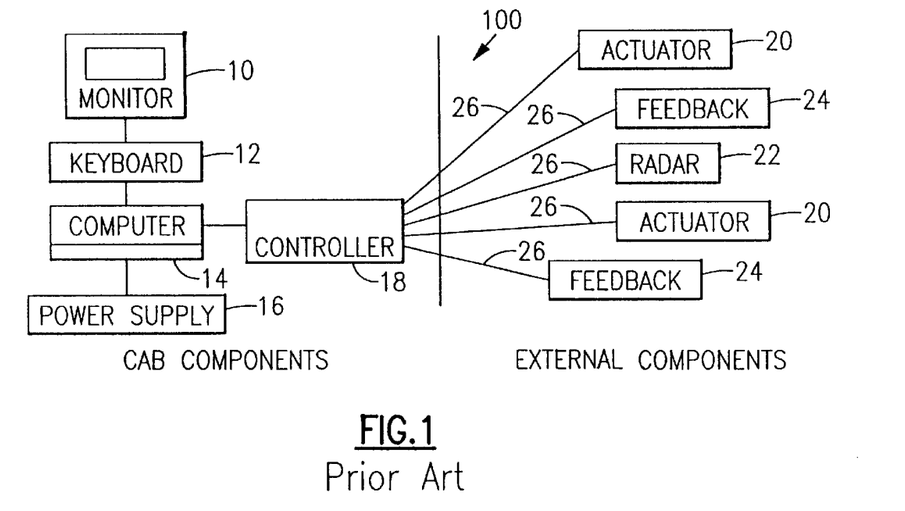
FIG. 1 is a simplified block diagram of a closed loop multiple loop control system for which reliance on processing resides entirely within a host, known to those skilled in the art.

Referring to FIG. 1, a currently known product application control system 100 includes a host controller 18 located within the cab of a vehicle (not shown), made up of a processor/computer 14 with associated input and output devices including monitor 10 and keyboard 12. The host controller 18 is responsible for all communication to devices such as actuators 20 including actuator feedback 24 to controller 18 and, for example, a radar device 22 on the chassis of the vehicle. As shown, and as previously discussed, the addition of loops 26 to the control requirements adds great complexity to the overall control system 100 wiring.

Figure 2:
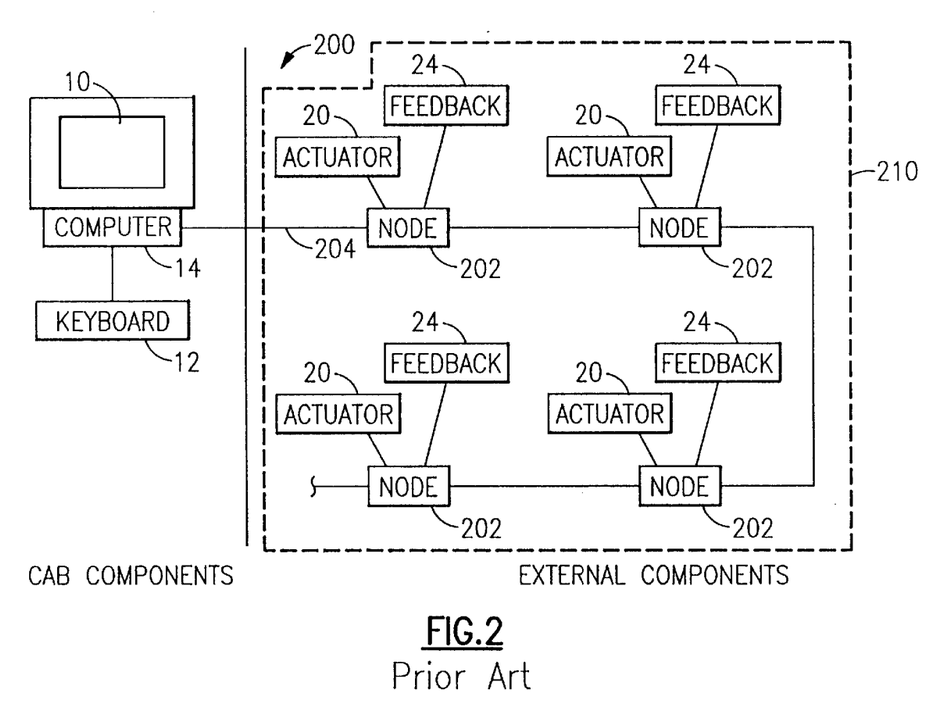
FIG. 2 is a simplified block diagram of a known distributed network control system wherein significant processing takes place in the nodes.

In FIG. 2, a known embodiment 200 for a product application control system similar to that described in the '924 patent to Monson et al. is shown. The system includes a processor/computer 14 with associated input and output devices including a monitor 10 and a keyboard 12, located within the cab of the vehicle (not shown). Computer 14 is connected to a single distributed network 210 via a single twisted pair of wires 204 which is run into the cab (not shown). All other system wiring is external to the cab.

The distributed network control system 200 includes multiple nodes 202, theoretically unlimited in number. It can thus be seen that the majority of the wiring displayed in the control system 100 illustrated in FIG. 1 has been moved beyond the cab to the location of the actuators 20 and sensing, feedback 24. It can be seen, therefore, as stated herein before and as specifically described in the '924 patent, that the complex common machine dependent wiring only occurs at the actuators 20 and in a modular fashion.

As stated hereinbefore, node 202 hardware is generally identical from node 202 to node 202, thereby implying that each machine product application control system 200 is identical, with the only differences being in the number of nodes 202 and the machine (not shown) dependent wiring.

The Multiple Network Control System

Keeping in mind the known art described above, the present inventive product application control system will now be discussed in detail with the aid of FIGS. 3–12 and following definitions.

Object-Oriented Software—software development using the object-oriented methodology which models the problem domain as a collection of real-world objects, and translates these objects into executable program code in a manner that promotes reusability, maintainability, and extendibility, among others.

Windows® Interface—a proprietary graphical user interface (GUI) extension of an operating system, built upon a message-based multi-tasking system, as opposed to a classical system built on a single thread of execution.

Distributed Network—a hardware design methodology that takes advantage of network communications and applies them in the control domain.

Echelon™ LonWorks™ Technology—a hardware system that fully exploits the distributed network concept, and greatly eases the more complex communication requirements that are brought about by the use of distributed processors.

CANs Technology—yet another hardware system that fully exploits the distributed network concept, and greatly eases the more complex communication requirements that are brought about by the use of distributed processors.

The system architecture basically refers to the overall structure and method of accomplishing a task in the environment of the network. That is to say, that once the network is in place, there are many methods and data structures for achieving the same end. If the network use is properly structured, the system design will, to a great extent, become independent of the media and network protocol used. Although Echelon™ network technology is presently preferred, the same structure as present utilizing Echelon™ network technology would transpose almost directly into similar network environments, e.g., CANs technology. In other words, the present multiple network control system may be used with any existing or contemplated network technology.

Preferably, the design of the present inventive multiple network control system creates a reliance on processing in the node(s) 202, by virtue of requiring complete PID capabilities and self-diagnostics, and processing capability within the host, to provide commands at predetermined intervals, e.g., one second, to each of the operating loops. This clear separation of processing allows the present inventive system to be created with very little reliance on the communication method between the host and particular network nodes. As stated herein before, Echelon network technology simplifies this communication, but other network technology, e.g., CANs could also be used.

FIGS. 3–7 are simplified block diagrams showing a host connected to a single network. These figures illustrate some of the alternatives which exist for computing and data storage capabilities of the system. Although a single network is shown the alternatives are equally applicable to a multiple network system.

Figure 3:
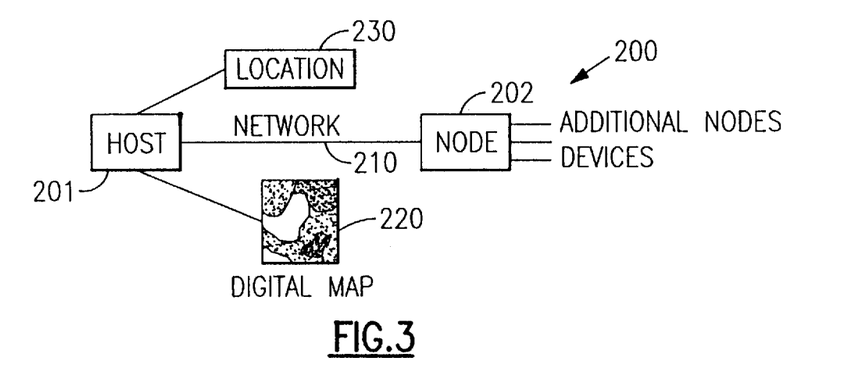
FIG. 3 illustrates a simplified depiction of the control system of FIG. 2, where map and GPS data structures typically reside in the host, and a network carries only setpoint information to the node(s).

FIG. 3 illustrates a simplified depiction of the control system 200 in FIG. 2, a known control system used in the agricultural industry for the application of agricultural products, where map 220 and GPS (global positioning system) 230 data structures typically reside in the host 201, and a network 210 carries only setpoint information to the node(s) 202. Each node may be connected to devices such as actuator 20 and feedback 24 as well as to additional nodes. Although control system 200 overcomes many of the attendant disadvantages inherent within known closed loop multiple loop control systems such as that illustrated in FIG. 1, it is clearly seen that such a system design continues to place a great burden on the host system. What is still needed within the agricultural industry as well as other industries which utilize self-propelled vehicle product application control systems, is even more flexibility to complete a desired task in several different manners with the same hardware, dependent only on the software and firmware (data structures) utilized. The present inventive control system will now be described in detail with reference to FIGS. 4–12.

Figure 4:
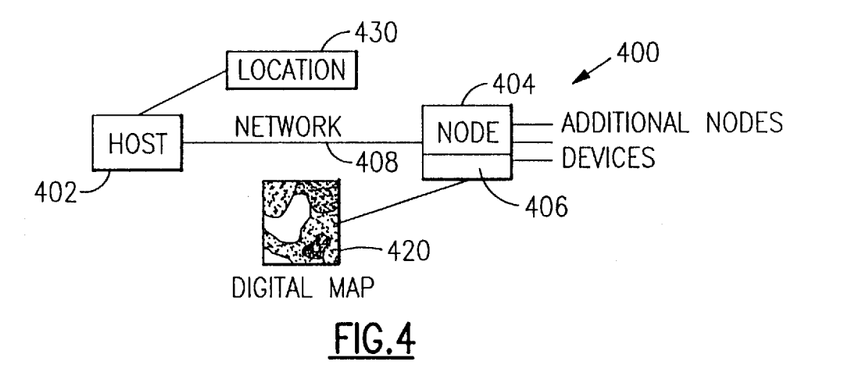
FIG. 4 is a simplified block diagram of one embodiment of a product application control system in accordance with the present invention where the GPS data structure(s) reside in a host, and map data structure(s) reside within the network node(s).

Referring to FIG. 4, one preferred embodiment 400 for the present inventive product application control system includes a host 402 with associated input and output devices (e.g., 12, 14 located within the cab of the vehicle). Embodiment 400 includes a nodal control module 406 located at each node 404. Placing a nodal control module 406 at the location of each actuator device 20 provides for downloading a digital description of a land area 420, for example, thereby making the nodes 404 more independent than nodes 202 utilized in prior known distributed network product application control systems for use in conjunction with self-propelled or towed vehicles. In this embodiment, location data 430 from a GPS system is the only information communicated on the network 408 (along with status data). Therefore, this embodiment requires a great deal of memory in the node(s) 404. Each node 404 has associated with it devices including, for example, an actuator 20 and feedback 24 as described with respect to FIG. 2.

Figure 5:
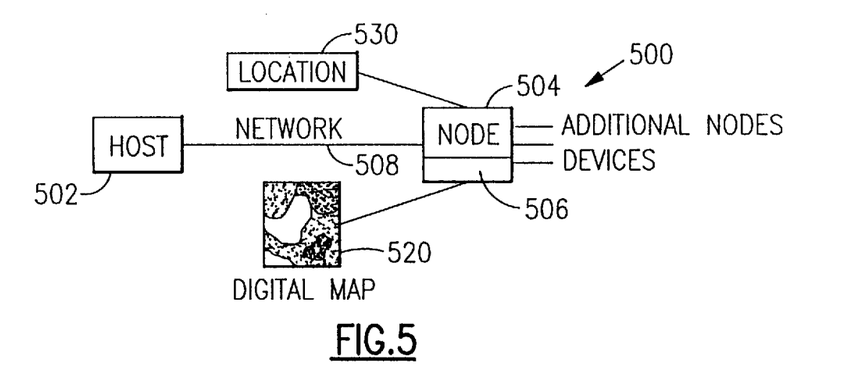
FIG. 5 is a simplified block diagram of another present product application control system, where the map data structure(s) and the GPS data structures reside entirely within the network node(s).

FIG. 5 is yet another preferred embodiment 500 for the present inventive product application control system. The system includes a host 502 with associated input and output devices, e.g., 12, 14 located within the cab of the vehicle. Embodiment 500 includes a nodal control module 506 located at each node 504. Each nodal control module 506 includes data structures at the location of each actuator device 20 which provide for downloading for both the map 520 and location data 530, for example, resulting in the host system 502 acting solely as a supervisor, with the nodes 504 acting in an autonomous fashion. It should be noted that GPS data 530 can be present on any node 504 within the network 508 with the same result. Such an embodiment of the present inventive control system requires the greatest processing capabilities for the nodes 504, as well as the greatest memory requirements.

Figure 6:
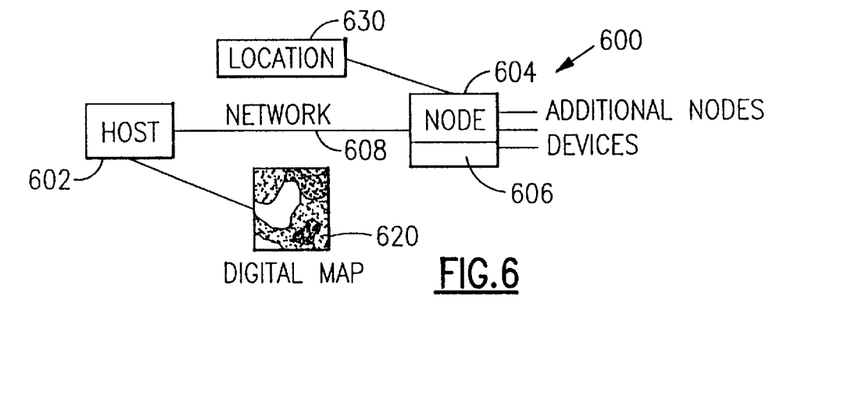
FIG. 6 is a simplified block diagram of yet another embodiment for the present product application control system, where the map data structure(s) reside in a host and the GPS data structure(s) reside entirely within the network node(s).

A further embodiment 600 of the present inventive product application control system is shown in FIG. 6. The product application control system includes a host 602 with associated input and output devices, e.g., 12, 14 located within the cab of the vehicle. Embodiment 600 includes a nodal control module 606 located at each node 604. Each nodal control module 606 includes data storage transfer structures at the location of each actuator device 20 which provide for downloading network based GPS signals 630, for example, in order to simplify the main host 602 design. Map data 620 is stored in the host. Typically, an extra serial port is required for such a GPS input for the control module 606. This embodiment 600 is preferred for any network capable system which does not increase processing power within the nodes 604. Although this embodiment would not increase the processing power for any particular node 604, it would require the node 604 to transmit its location to the host 602 before receiving a command setpoint. Thus, this embodiment 600 could be somewhat slower, and would increase the network traffic over that expected with other embodiments of the present inventive system described above.

Figure 7:
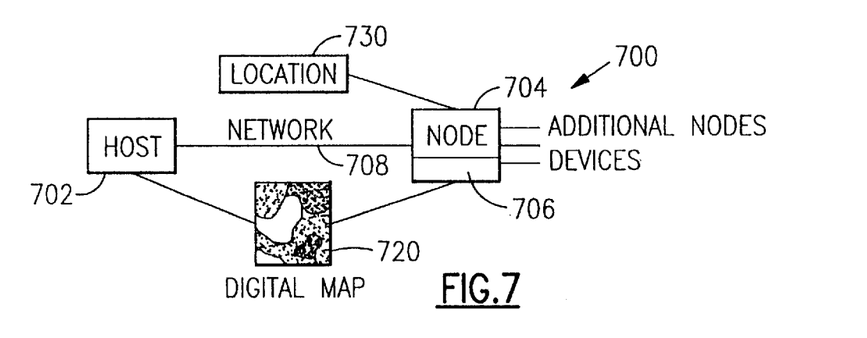
FIG. 7 is a simplified block diagram of another embodiment for the present product application control system, where the GPS data structure(s) reside entirely within the network node(s) and where the map data structure(s) reside in both a host as well as within the network node(s).

FIG. 7 shows a preferred embodiment 700 for distribution of data storage and computer capabilities for the present inventive control system. Embodiment 700 includes a nodal control module 706 located at each node 704. Each nodal control module 706 includes data storage and transfer structures at the location of each actuator device which provides for downloading network based GPS signals 730 similar to that described with respect to FIG. 6. In this embodiment map data storage and transfer structures reside in both a host 702 as well as within the network nodes 704. The distinction of embodiment 700 is, therefore, that map data 720, could reside to some extent in more than one location. As disclosed in U.S. Pat. No. 5,220,876 issued to Monson et al., there may be at least two maps present in the system. For example, one map may correspond to the digital description of the field and the other may describe how product application rates are related to the colors on the map. This can be a one dimensional map. In the case where the digital description of the field resides in the host, a look up table can reside in the node 704 with setpoint data. This results in network traffic being comprised of the host 702 telling the nodes 704 at what array location the machine is presently located. Embodiment 700 is advantageous in that communication in the network is minimized.

Figure 8:
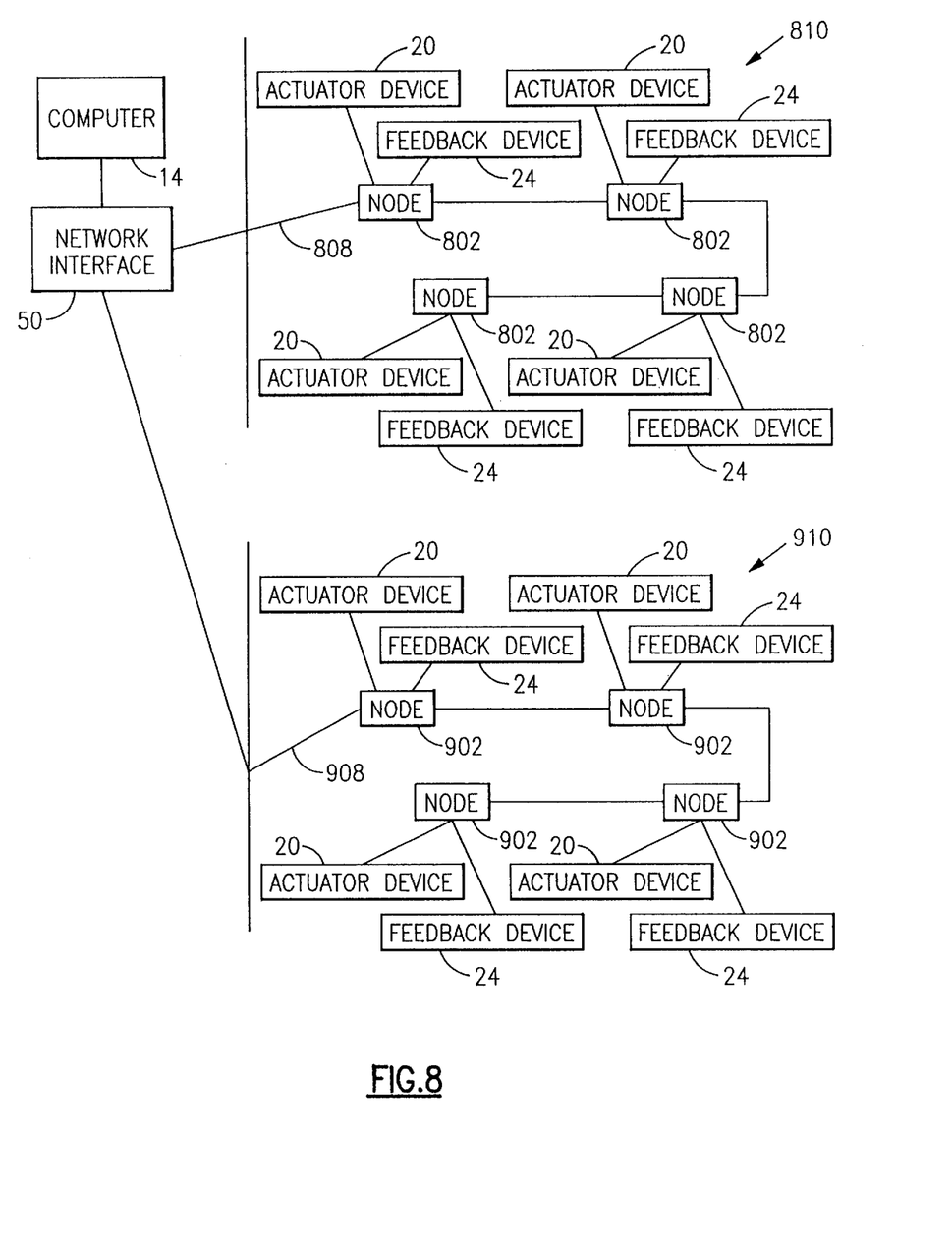
FIG. 8 is a simplified block diagram of a multiple network product application control system in accordance with the present invention.

One of the advantages of downloading data and control responsibilities to the nodes is that the host is then free from the task of performing nodal control functions. By freeing the host from time critical activities of the control system it is possible to create a system capable of running several control/status networks simultaneously on a vehicle. The host is thus capable of monitoring and serving several independent networks. Such a multiple network control system is shown in FIG. 8. The control system includes two or more independent networks 810 and 910. Networks 810 and 910 communicate with a processor/computer 14 having associated input and output devices, e.g., monitor 10 and a keyboard 12 (not shown) through a network interface 50. Network interface 50 communicates with distributed networks 810 and 910 via cables 808 and 908, respectively. Cables 808 and 908 each include a twisted pair of conductors for carrying network data between network interface 50 and independent distributed networks 810 and 910 but the present invention is not so limited and other communication cables or methods of communication, including wireless, may be used within the scope of the invention. Each distributed network requires only one cable per network to enter the cab for full operation of each network and all devices. This is a great simplification from the traditional layout where dozens of wires enter the cab. Thus, troubleshooting and maintenance are greatly simplified and the network has provided a method of self-diagnostics by design. Obviously, if feedback is not received at the node, the problem lies between the node and device, rather than somewhere between the controller and the device.

Expansion of either distributed network 810 or 910 is easily accomplished by simply extending the network to a new node and providing the necessary node/device wiring. This allows the design to be completed in a completely modular fashion as each network remains independent of the others.

Each distributed network 810 and 910 includes multiple nodes 802 and 902, respectively. Each of the nodes has associated with it at least one actuator 20 and, preferably, a feedback device 24, although it will be appreciated that feedback is not always necessary. Each of the nodes 802 and 902 has a node controller which functions in a manner similar to those described in connection with FIGS. 4–7.

Operation of the Control System

Figure 9:
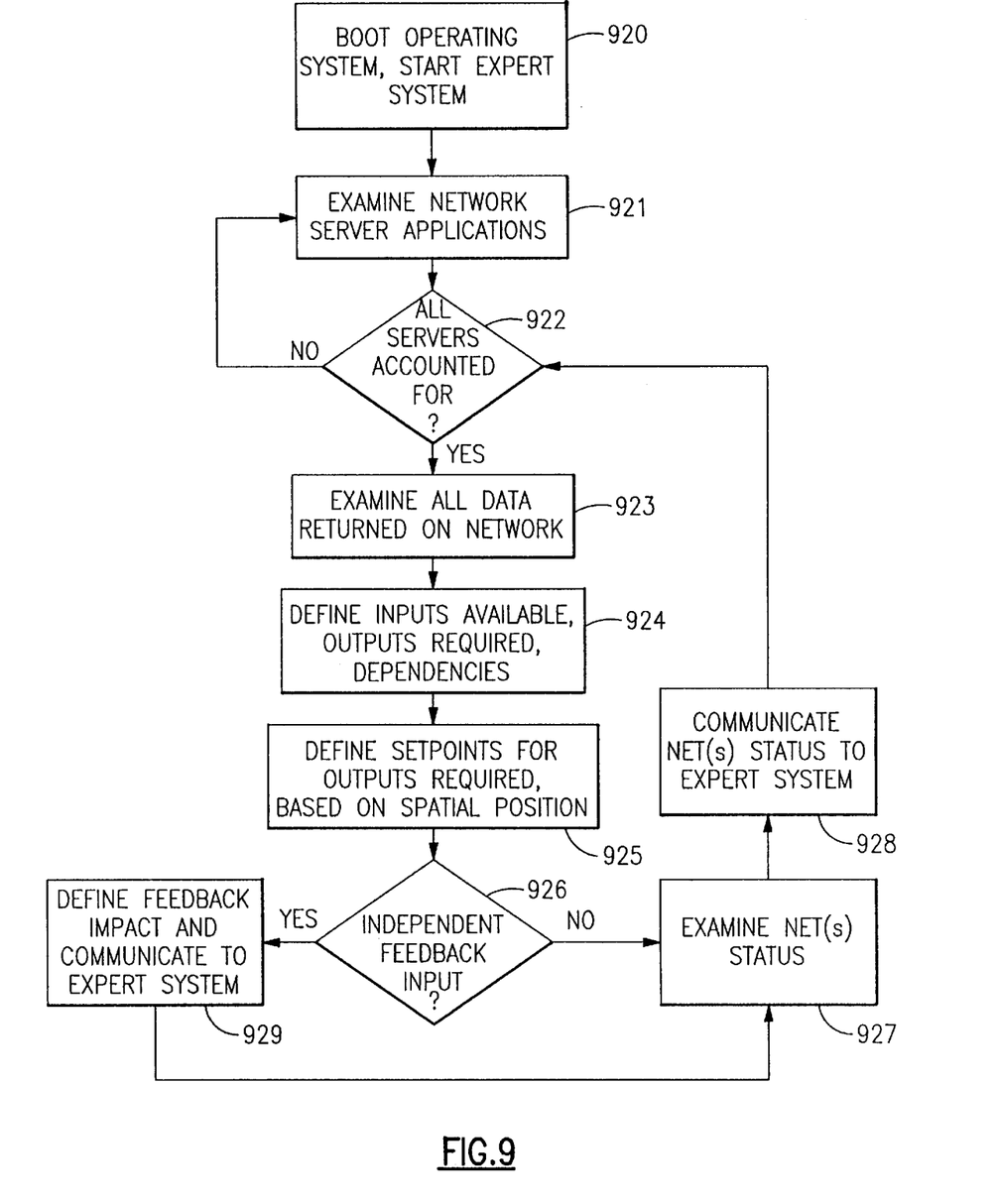
FIG. 9 is a flow diagram for the host system tasks for operating the present product application control system shown in FIG. 8.
Figure 10:
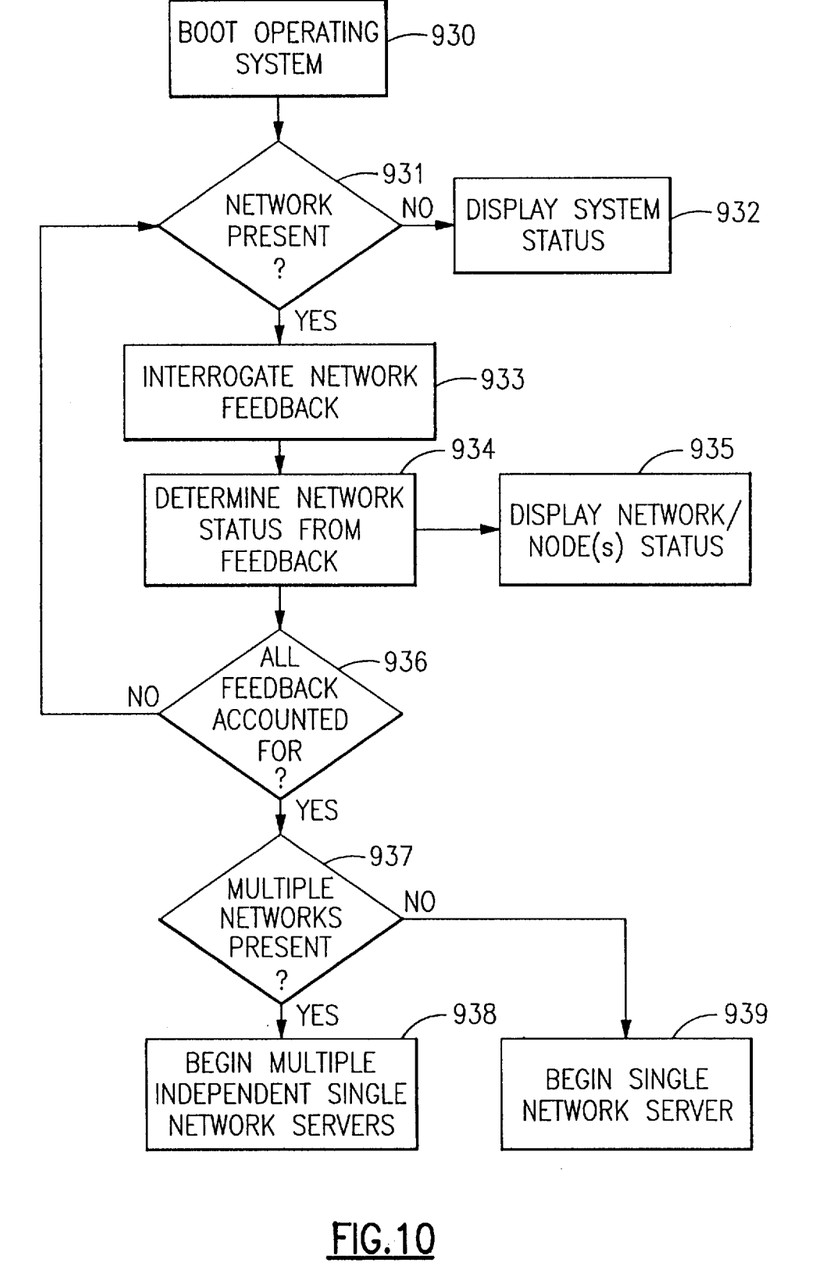
FIG. 10 is a flow diagram of a multiple network server start-up for operating the present product application control system shown in FIG. 8.
Figure 11:
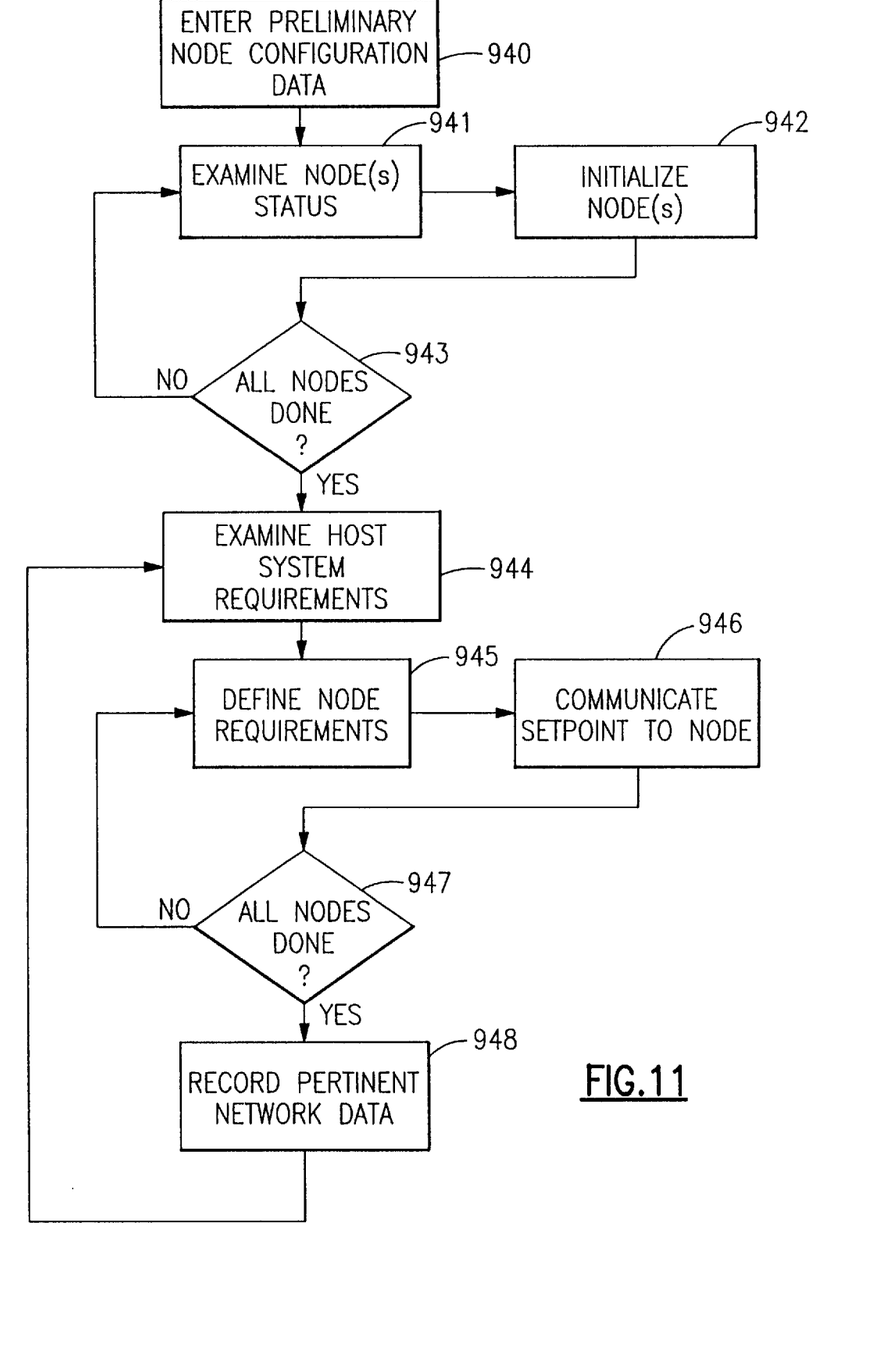
FIG. 11 is a flow diagram of a single network server for operating the present product application control system shown in FIG. 8.
Figure 12:
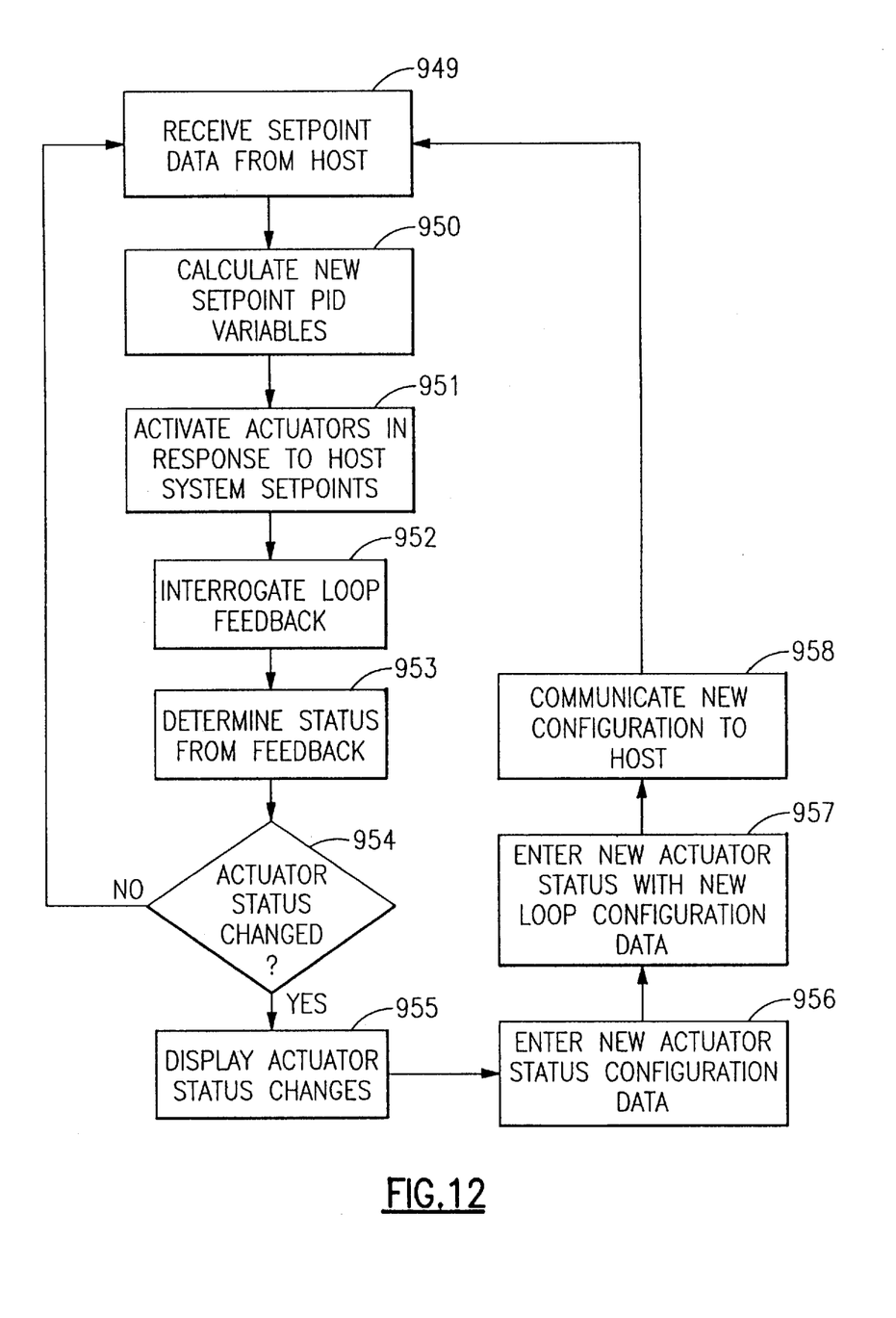
FIG. 12 is a flow diagram of internal node control for operating the present product application control system shown in FIG. 8.

The operation of the product application control system can be understood generally with respect to FIGS. 9–12 which are flow diagrams of a preferred algorithm used to operate the various functional levels of the control system. FIG. 9 is a flow diagram of the system tasks performed by the host during operation. FIG. 10 is a flow diagram of the algorithm which operates the multiple network server start-up. FIG. 11 is a flow diagram of the operation of each network server. FIG. 12 is a flow diagram of internal node control operations. It will be understood that the control system operates simultaneously at each of these levels in a coordinated manner.

As seen in FIG. 9, the host operating system is booted up at step 920. An expert system is also started at this time. The expert system is the artificial intelligence device which processes all of the complex calculations associated with the control of product application. It is a system defined by the use of one or more relationships between one or more factors that relate to crop production. The relationships may be mathematical, spatial, user defined or others; examples include recommendation equations for a given nutrient and crop as published by most state universities. Similar expert systems have been described in the '876 and '924 patents to Monson et al. The expert system of the present invention performs similar functions. It will be appreciated, however, that in the present multiple network system much of the responsibility for data storage and performance of calculations has been shifted downward to the node level. Therefore, the expert system as contemplated herein may include components within the host as well as the node controllers.

At step 921 an examination of network server applications is made. A determination is made at decision block 922 whether all servers are accounted for. If not, the algorithm loops back to step 921. When all servers are accounted for an examination of all data returned on the network is made at step 923. This data is then analyzed at step 924 to define inputs available, outputs required, and dependencies. The algorithm then proceeds, at step 925, to define setpoints for outputs required at each node based upon the spatial position of the vehicle. In the algorithm shown in FIG. 9, the calculation of setpoints at step 925 assumes that the map resides in the host. As previously discussed with respect to FIGS. 4–7 it is possible to download map information to the nodes or to include map information at both the host and node level. Therefore, depending upon the location of the map data the setpoint calculation may be performed in the host, at the node controller level or some combination thereof.

After the setpoints have been calculated a determination is made at decision block 926 whether independent feedback inputs exist. These independent feedback inputs may consist of the input from one or more sensors which sense data related to plant development. Such sensors may be used to calculate from soil samples taken periodically during the procedure certain characteristics such as nitrogen level, potassium level, phosphorous level, soil type, pH level, soil temperature, and herbicide, pesticide or fungicide levels, for example. These sensors may operate on a continual or intermittent basis to provide data on a real time basis which is used by the control system for updating the data used in product application control. This data may originally be comprised of pre-loaded maps which may then be updated in real time by the sensor data as the product application process proceeds. The information obtained from the sensors is analyzed for validity and, if valid, is utilized to update the existing data to provide the highest degree of accuracy at the present time. If the sensed data is invalid or inconclusive it is not used. In that case the system would utilize existing data. Therefore, even in the case of a sensor failure where no data is forthcoming the system would continue to be as accurate as the existing map data, which means, even in a worst case scenario, that the system is as accurate as those in use today.

If feedback is determined to exist at decision block 926 it is analyzed at step 929 to determine its impact and is communicated to the expert system. If no independent feedback inputs exist or if the feedback information has been analyzed and communicated to the expert system then an examination of network status is made at step 929. The status of the networks is communicated to the expert system at step 928 which then loops back to step 922 to start the process over again.

FIG. 10 is a flow diagram of the algorithm used for the multiple network server start-up. At step 930 the operating system is booted up. At decision block 931 a determination is made of the presence of the network. If the network is not sensed a display of system status is made at step 932. If the network is sensed network feedback is interrogated at step 933. A determination of network status from the feedback is made at step 934 and is displayed at step 935. At decision block 936 a determination is made whether all feedback is accounted for. If not, the algorithm loops back to decision block 931 to repeat the process until all feedback has been accounted for.

When all feedback is accounted for a determination is made at decision block 937 of the existence of multiple networks. If multiple networks are not sensed a single network server is begun at step 939. If multiple networks are sensed multiple independent single network servers are begun at step 938, one for each network on the system.

FIG. 11 is a flow diagram of the algorithm used for the single network server. Preliminary node configuration data is entered at step 940. The configuration data may be comprised of a short piece of code that is sent via the network to each specific node to configure node firmware for operation. The data defines pin assignments, constants, control technique, system variables and reporting requirements, among others. All executable software on the node is transmitted to the node by the host. The process effectively starts the node control software into operation.

At step 941 the status of the node(s) is examined. The nodes are initialized at step 942 according to the node configuration data received from the host. At decision block 943 a determination is made whether all nodes have been initialized. If not, the algorithm loops back to step 941 for the process to continue until the initialization of all nodes has been completed. When the node initialization process is complete the host system requirements are examined at step 944. It is at this step that the setpoints which were calculated at step 925 of the host system tasks algorithm (FIG. 9) are communicated to the network server. The calculated setpoints for the required outputs are utilized to define the node requirements at step 945. The setpoints for the required outputs are communicated to the nodes at step 946. A determination is made at decision block 947 whether setpoint requirements have been communicated to all nodes. If not, the algorithm loops back to step 945 until setpoint communication to all nodes has been completed. Once completed, the system records pertinent network data. This may consist of updating maps or to otherwise provide a current status of system operation.

FIG. 12 is a flow diagram of the algorithm used for internal node control. Setpoint data is received from the host at step 949. This is the data that is communicated by the network server at step 946 of FIG. 11. The setpoint data is used to calculate new setpoint PID variables at step 950. The PID logic is programmed into the node firmware (software resident in the node non-volatile memory). This allows better control than centralized traditional control. Since the processor is located at the site of the control it is required only to maintain the particular node setpoint to which it has been assigned.

At step 951 the actuator is activated in response to host system setpoints. Loop feedback is interrogated at step 952 and the status of the node is determined from the feedback at step 953. At decision block 954 a determination is made whether actuator status has changed. If the status has not changed the algorithm loops back to step 949 to receive additional setpoint data from the host. If the actuator status has changed, for example, as the result of a watch dog alarm known to those of skill in the art, the actuator status change is displayed at step 955. New actuator status configuration data is entered at step 956. At step 957 new actuator status with new loop configuration data is entered and the new configuration data is communicated to the host at step 958. The algorithm then loops back to step 949 to receive new setpoint data from the host.

It is apparent from the foregoing that the multiple-network control system described above may be used to accurately control product application in an accurate and dependable manner. Since one embodiment of the control system is reactive to a land area map, there are, however, certain system constraints for that embodiment which may make the system difficult to use for some applications. For example, a land area map which is adequate for dry spreaders without nozzle control may have a pixel size of ten feet on a side. However, in order to control application of liquid fertilizer which requires independent control for each liquid nozzle a pixel size of approximately 1 foot per side is needed. This means that the data size for the land area map grows by a factor of 100. Such a map may be too large to be provided on a single disk, depending upon field size, and would take a great deal of time to load.

Control System with Incorporated GIS

In a further embodiment of the invention this problem is solved by eliminating the need to utilize a land area map to calculate a spread value of the product. Rather, the spread value in this embodiment is calculated based solely upon the identical raw data that is provided in the map creation process. Discussion of the creation of land area maps is contained in the '876 and '924 patents to Monson et al. and '773 patent to Ortlip, each of which has been incorporated herein by reference in their entirety. Further, maps useful for use in the product application vehicles described herein are disclosed in U.S. patent application Ser. No. 08/452,894 entitled "System and Method for Creating Agricultural Decision and Application Maps for Automated Agricultural Machines", filed on May 30, 1995 and incorporated herein by reference in its entirety. This application describes a system and method for creating agricultural decision and application maps in real time using information obtained from various sources. The system disclosed is an improvement over known geographical information systems (GIS) which convert agronomic data to geo-referenced map information.

The control system of this embodiment of the present invention is based upon the premise that only a very small portion of the information contained on a map is needed at any particular time. Thus, if sufficient processing power is available in the control system, the system can calculate the values which are ordinarily obtained from the land area map on a per position basis, thereby eliminating the need for the direct input of a spatially related digital map. The map may or may not be created prior to the product application in order to create an estimated plan for the filling and tendering of the vehicle. This map, however, need not be incorporated into the product application control system of this embodiment since control setpoints are calculated directly from the raw geographic information data which is used to create the digital map.

Raw geographic information data includes anything related to plant development characteristics. This raw data may be input into the system using various methods such as by keyboard entry, disk drive, optical system, CD ROM and radio communication to name a few.

It is important to note that the resolution of the set point data can be selected by the operator based on the operator's perception of the need for accuracy required for the present job and is not limited by the accuracy of any of the system inputs since all resolution dependent calculations are made in the field. For example, utilizing the same system inputs, the applicator of a liquid fertilizer could apply one a one (1) foot resolution basis while the applicator of a dry fertilizer could apply on a ten (10) foot resolution basis in a manner which is consistent and seamless to the operator.

The control system would preferably include the improved GIS system disclosed in the above-identified patent application. Thus, the system has the ability to incorporate additional and differing sensors such as the sensors which sense characteristics relating to plant development discussed above and to utilize the data provided by those sensors to calculate on a real time basis setpoint values needed for each node. Additional sensors might include organic matter sensors, real time soil analysis sensors, soil texture sensors or soil terrain sensors. Each of these inputs, when combined with data from the GIS system, provide the needed variables to calculate on a real time basis application values based upon present in-field conditions. Additionally, attribute data may be loaded into the system and used to calculate the control setpoints. Attribute data includes data that is not specifically tied to a geocoordinate and may include input costs, dealer and farmer information, such as name, address, account identification, etc. This allows very accurate high resolution calculations to be made without resort to a high resolution map which may be too large for the system and/or difficult and time consuming to load.

Figure 13:
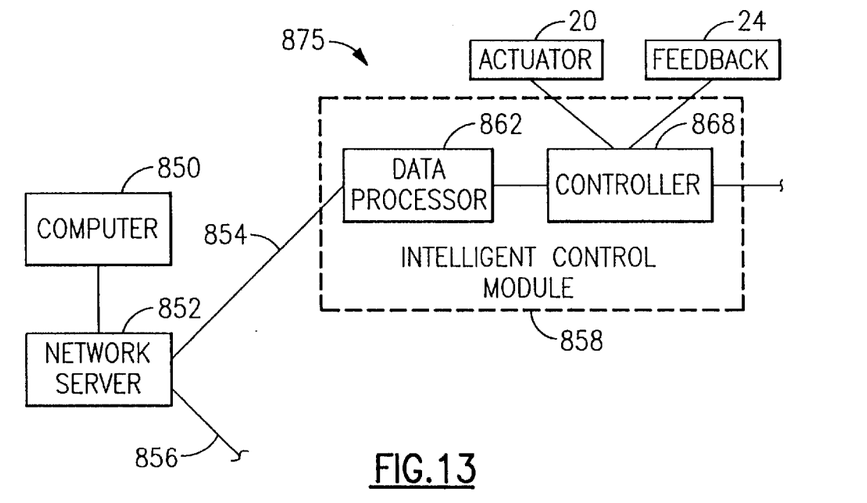
FIG. 13 is a simplified block diagram of a further embodiment of the invention having an incorporated GIS (geographic information system).

FIG. 13 is a block diagram of a control system with an incorporated GIS system in accordance with this embodiment of the invention. The control system includes at least one distributed network 875. Network 875 communicates with a network sever 852 via cable 854. Network server 852 provides the interface for communicating data between the network and a host central processing unit such as computer 850. Additional networks may be connected to network server 852 such as by cable 856. Communication between the networks and network server 852 may, alternatively, be implemented in other ways known to those of skill in the art including the use of wireless communication.

Distributed network 875 includes an intelligent control module 858. Control module 858 further includes a geographic information raw data processor 862 and a controller 868. Intelligent control module 858 has computing, memory storage and control capabilities which are sufficient to enable it to effectively operate as a standalone autonomous controller. Geographic information raw data processor 862 is a general purpose computer which has been configured for the specialized purpose of processing raw geographic information data, attribute data and other sensed data as described above and for determining a target rate of application for the product(s) being applied based upon relationships provided by the expert system. Each intelligent control module has associated with it at least one actuator 20 and preferably a feedback device 24.

As an alternative to the configuration illustrated in FIG. 13, the geographic information raw data processor 862 may reside within computer 850. Obviously, this requires less computing and data storage capability at the level of the intelligent control module and places a greater burden on the host computer 850. Additionally, the level of communication between the host computer and the distributed network 875 increases accordingly. A further alternative is for the geographic information raw data processor 862 to be located such that a first portion is contained within intelligent control module 858 and a second portion is contained within computer 850. This illustrates the flexibility of system design which allows the system to be configured according to the particular requirements of the product application system being controlled.

Figure 14:
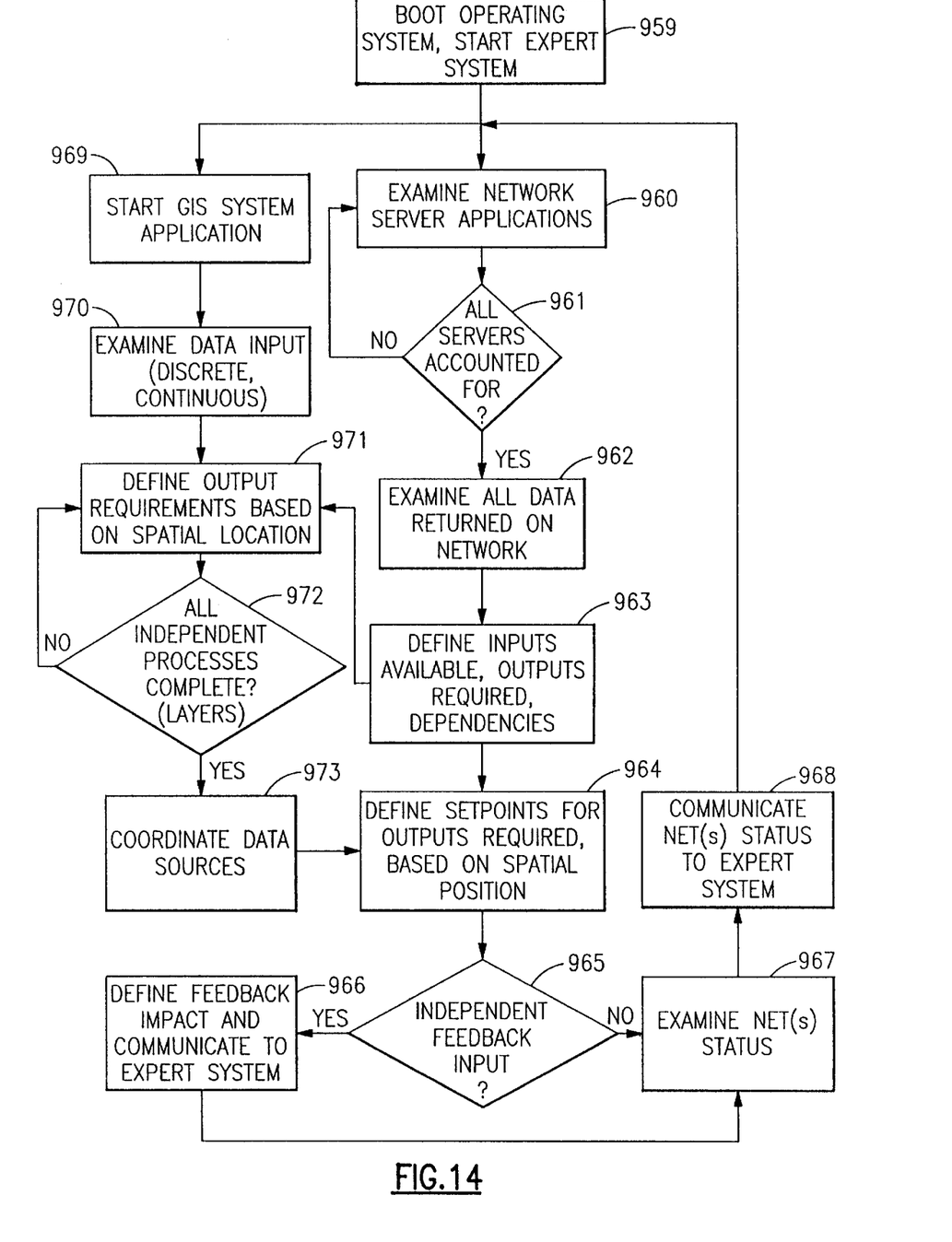
FIG. 14 is a flow diagram similar to FIG. 9 of host system tasks of the embodiment of FIG. 13.

The operation of the control system of this embodiment can be understood with reference to FIG. 14 which is a flow diagram of the host system tasks. This diagram is similar to the diagram of FIG. 9, the difference being the inclusion of the GIS system within the control system. It will be understood that the remainder of the system is similar to that discussed with respect to FIGS. 10–12 and includes multiple network server start-up, single network server and internal node control functions.

The system is booted up at step 959. Network server applications are examined at step 960. At decision block 961 a determination is made if all servers are accounted for. If they aren't the algorithm loops back to step 960. If all servers are accounted for all data returned on the network is examined at step 962. At step 963 inputs available, outputs required and dependencies are defined. The defined data is transmitted to step 971 of the GIS system application as will be discussed later and to step 964 for calculation of setpoints based on the spatial position on the vehicle. These setpoints are dependent, in part, upon data provided by the GIS system at step 973.

The GIS system is started at step 969. At step 970 data from various input sensors is examined. This data may be from any desired real time sensors, some of which are identified above. Output requirements based on spatial location are defined at step 971. At decision block 972 a determination is made whether all independent processes are complete. These independent processes may include a multilayer data analysis of information from various sources. If the independent processes are not complete the algorithm loops back to step 971. If the processes are complete, data sources are coordinated at step 973 and the data is provided for setpoint definition at step 964.

At decision block 965 a determination is made whether independent feedback input exists. Consistent with the discussion of FIG. 9, the independent feedback input may be from sensors which are related to crop development. If independent feedback exists the impact of the feedback is defined and communicated to the expert system at step 966. If independent feedback does not exist or if step 966 has been completed an examination of the net(s) status is made at step 967. The status is communicated to the expert system at step 968. The algorithm then loops back to steps 960 and 969 to repeat the process.

Having thus described the preferred embodiments in sufficient detail to permit those of skill in the art to practice the present invention without undue experimentation, those of skill in the art will readily appreciate other useful embodiments within the scope of the claims hereto attached. For example, although the present invention has been described as useful for the agronomic industry, those of skill in the art will readily understand and appreciate that the present invention has substantial use and provides many benefits in other industries as well. Some of those may include practicing the present invention to spread products such as sand, gravel or salt on roads or highways. In general, the agronomic community would find the present invention useful in applying products such as fertilizers including starter fertilizers, insecticides, herbicides, as well as seeds. It is to be further appreciated that the present invention may apply such products in either liquid or solid form. The invention is also applicable to areas of the agronomic industry in addition to application of products. For example, it is known to be desirable to adjust the depth of tillage equipment in dependence on soil moisture. However, no presently used equipment is able to control tillage depth on a real time basis. By utilizing the control system of the present invention it is possible to use real time data collected by a soil moisture sensor to adjust tillage depth by controlling an actuator(s) which is responsible for depth control. Thus, the present invention is applicable to any situation where it is desirable to control an agronomic input (e.g., product application, tillage depth, etc.) based upon the real time measurement of data related to crop development.

I claim:

1. A mobile product application control system comprising:
   a vehicle;
   at least one distributed network coupled to the vehicle, the at least one distributed network including at least one intelligent control module wherein the at least one intelligent control module includes a geographic information raw data processor;
   an algorithmic software directing said geographic information raw data processor such that said geographic information raw data processor can determine product application rate data in real time for selected products using algorithmically defined relationships between valid discrete raw geographic information data as said valid discrete raw geographic information data is extracted from said predetermined geographic land area, and as said vehicle traverses a predetermined geographic land area, each at least one intelligent control module being responsive to said application rate data for controlling spatial position dependent set points for at least one actuator device, such that at least one predetermined product is applied to said predetermined geographic land area at variable rates determined by the spatial position dependent set points in real time as said vehicle traverses said predetermined geographic land area;
   at least one central processor coupled to the at least one distributed network; and
   at least one geographic information raw data input device coupled to the at least one distributed network.

2. The mobile product application control system of claim 1 further comprising a network server coupled between the at least one central processor and the at least one distributed network for controlling the exchange of information between the at least one central processor and the at least one distributed network.

3. The mobile product application control system of claim 2 further comprising an expert system coupled to the at least one distributed network, the expert system defining the relationships between the raw geographic information data, those relationships being utilized by the geographic information raw data processor to determine a target rate of application of the at least one predetermined product.

4. The mobile product application control system of claim 1 wherein the vehicle is self-propelled.

5. The mobile product application control system of claim 1 wherein the vehicle is equipped for towing.

6. The mobile product application control system of claim 1 wherein the raw data processor processes attribute data input from the data input device and wherein the at least one intelligent control module is responsive to the attribute data for controlling the at least one actuator device.

7. The mobile product application control system of claim 1 further comprising at least one data sensor coupled to the at least one distributed network for updating at least a portion of the geographic information raw data on a real time basis.

8. A mobile product application control system comprising:
   a vehicle;
   at least one distributed network coupled to the vehicle, the at least one distributed network including at least one intelligent control module for controlling at least one actuator device;
   at least one central processor coupled to the at least one distributed network, the at least one central processor including a geographic information raw data processor;
   an algorithmic software directing said geographic information raw data processor such that said geographic information raw data processor can determine product application rate data in real time for selected products using algorithmically defined relationships between discrete raw geographic information data as said discrete raw geographic information data is being extracted from a predetermined geographic land area, and as said vehicle traverses said predetermined geographic land area, said geographic information raw data processor being responsive to the input of valid discrete raw geographic information data for generating spatial position dependent set point control data which is communicated to the at least one intelligent control module, such that the at least one actuator device is controlled in a manner that causes at least one predetermined product to be applied to said predetermined geographic land area at variable rates determined by the spatial position dependent set point control data; and
   at least one geographic information raw data input device coupled to the at least one central processor.

9. The mobile product application control system of claim 8 further comprising a network server coupled between the at least one central processor and the at least one distributed network for controlling the exchange of information between the at least one central processor and the at least one distributed network.

10. The mobile product application control system of claim 9 further comprising an expert system coupled to the at least one distributed network, the expert system defining the relationships between the raw geographic information data, those relationships being utilized by the geographic information raw data processor to determine a target rate of application of the at least one predetermined product.

11. The mobile product application control system of claim 8 wherein the vehicle is self-propelled.

12. The mobile product application control system of claim 8 wherein the vehicle is equipped for towing.

13. The mobile product application control system of claim 8 wherein the raw data processor processes attribute data input from the data input device and wherein the at least one intelligent control module is responsive to the attribute data for controlling the at least one actuator device.

14. The control system of claim 8 further comprising at least one data sensor coupled to the at least one distributed network for updating at least a portion of the geographic information raw data on a real time basis.

15. A mobile product application control system comprising:
   a vehicle;
   at least one distributed network coupled to said vehicle, the at least one distributed network including at least one intelligent control module for controlling at least one actuator device;

at least one central processor coupled to the at least one distributed network;

a geographic information raw data processor having a first portion which is contained within the intelligent control module and a second portion which is contained within the at least one central processor;

an algorithmic software directing said geographic information raw data processor such that said geographic information raw data processor can determine product application rate data in real time for selected products using algorithmically defined relationships between valid discrete raw geographic information data as said valid discrete raw geographic information data is being extracted from a predetermined geographic land area, and as said vehicle traverses said predetermined geographic land area, the geographic information raw data processor being responsive to the input of said valid discrete raw geographic information data to cause the intelligent control module to control spatial position dependent set points for the at least one actuator device in a manner such that at least one predetermined product is applied to said predetermined geographic land area at variable rates determined by the controlled spatial position dependent set points; and at least one geographic information raw data input device coupled to said at least one central processor and at least one distributed network.

16. The mobile product application control system of claim 15 further comprising a network server coupled between the at least one central processor and the at least one distributed network for controlling the exchange of information between the at least one central processor and the at least one distributed network.

17. The mobile product application control system of claim 16 further comprising an expert system coupled to the at least one distributed network, the expert system defining the relationships between the raw geographic information data, those relationships being utilized by the geographic information raw data processor to determine a target rate of application of the at least one predetermined product.

18. The mobile product application control system of claim 15 wherein the vehicle is self-propelled.

19. The mobile product application control system of claim 15 wherein the vehicle is equipped for towing.

20. The mobile product application control system of claim 15 wherein the raw data processor processes attribute data input from the data input device and wherein the at least one intelligent control module is responsive to the attribute data for controlling the at least one actuator device.

21. The control mobile product application system of claim 15 further comprising at least one data sensor coupled to the at least one distributed network for updating at least a portion of the geographic information raw data on a real time basis.

22. A mobile product application control system comprising:

a vehicle;

at least one actuator device coupled to the vehicle;

intelligent control means for controlling the at least one actuator device;

a raw data processing means;

an algorithmic software directing said raw data processing means such that said raw data processing can determine product application rate data in real time for selected products using algorithmically defined relationships between valid discrete raw geographic information data as said valid discrete raw geographic information data is extracted from a predetermined geographic land area, and as said vehicle traverses said predetermined geographic land area, wherein said raw data processing means is responsive to said algorithmic software for causing the intelligent control means to control spatial position dependent set points for the at least one actuator device such that at least one product is applied to said predetermined geographic land area at variable rates determined by the controlled spatial position dependent set points;

at least one network means for distributing the control means on a distributed network;

central processing means coupled to the distributed network for communicating configuration and coordination data to the distributed network; and geographic information raw data input means for providing said discrete geographic information raw data to the raw data processing means as said vehicle traverses said predetermined geographic land area.

23. The mobile product application control system of claim 22 further comprising a network server coupled between the at least one central processing means and the at least one distributed network for controlling the exchange of information between the at least one central processing means and the at least one distributed network.

24. The mobile product application control system of claim 23 further comprising an expert system coupled to the at least one distributed network, the expert system defining the relationships between the raw geographic information data, those relationships being utilized by the geographic information raw data processor to determine a target rate of application of the at least one predetermined product.

25. The mobile product application control system of claim 22 wherein the vehicle is self-propelled.

26. The mobile product application control system of claim 22 wherein the vehicle is equipped for towing.

27. The mobile product application control system of claim 22 wherein the raw data processor processes attribute data input from the data input device and wherein the at least one intelligent control module is responsive to the attribute data for controlling the at least one actuator device.

28. The mobile product application control system of claim 22 further comprising at least one data sensor coupled to the raw data processing means for updating at least a portion of the geographic information raw data on a real time basis.

29. A method of controlling application of a product to a predetermined geographic land area comprising:

providing a vehicle having at least one geographic information raw data sensor and at least one actuator device operably connected thereto;

causing the vehicle to travel over the surface of the geographic land area;

sensing raw geographic information data at predetermined sites on the predetermined geographic land area as said vehicle travels over the surface of the predetermined geographic land area;

processing the raw geographic information data relating to the predetermined geographic land area as said vehicle travels over the surface of the predetermined geographic land area;

controlling a spatial position dependent set point for each said at least one actuator device for each said predetermined site on the predetermined geographic land area such that at least one predetermined product is applied to the predetermined geographic land area at variable rates determined by the processed raw geographic information data in real time as the vehicle traverses the predetermined geographic land area.

* * * * *